(12) United States Patent
Neville et al.

(10) Patent No.: US 8,970,859 B2
(45) Date of Patent: Mar. 3, 2015

(54) VIRTUAL PRINTER INTERFACE NODE

(71) Applicant: Xerox International Partners, Palo Alto, CA (US)

(72) Inventors: Russell Neville, Tualatin, OR (US); Ashok Murthy, Union City, CA (US); Yoshiaki Takahashi, Mountain View, CA (US)

(73) Assignee: Xerox International Partners, Palo Alto, CA (US)

( * ) Notice: Subject to any disclaimer, the term of this patent is extended or adjusted under 35 U.S.C. 154(b) by 0 days.

(21) Appl. No.: 13/793,324

(22) Filed: Mar. 11, 2013

(65) Prior Publication Data

US 2014/0253960 A1    Sep. 11, 2014

(51) Int. Cl.
  *G06F 15/00* (2006.01)
  *H04N 1/00* (2006.01)
  *G06K 15/00* (2006.01)

(52) U.S. Cl.
  CPC ........ *H04N 1/00244* (2013.01); *G06K 15/4045* (2013.01); *H04N 1/00278* (2013.01)
  USPC ...................................................... 358/1.13

(58) Field of Classification Search
  CPC ................... H04N 1/00244; H04N 1/00278
  USPC ........................................................ 358/1.15
  See application file for complete search history.

(56) References Cited

U.S. PATENT DOCUMENTS

| | | | |
|---|---|---|---|
| 7,623,258 B2 | 11/2009 | Kajiwara et al. | |
| 8,116,289 B2 | 2/2012 | Moon | |
| 8,189,225 B1 | 5/2012 | Lo et al. | |
| 8,233,177 B2 | 7/2012 | Lawrence et al. | |
| 2006/0126104 A1 | 6/2006 | Kumar | |
| 2007/0230463 A1 | 10/2007 | Shima et al. | |
| 2011/0283276 A1 | 11/2011 | Andrews et al. | |
| 2011/0299110 A1 | 12/2011 | Jazayeri et al. | |
| 2012/0044538 A1 | 2/2012 | Lin et al. | |
| 2012/0057193 A1 | 3/2012 | Jazayeri et al. | |
| 2012/0081738 A1 | 4/2012 | Seki | |
| 2012/0084781 A1 | 4/2012 | Isaka | |
| 2012/0092704 A1 | 4/2012 | Kumazawa | |
| 2012/0124187 A1 | 5/2012 | Onda et al. | |
| 2012/0293826 A1 | 11/2012 | Saurabh | |
| 2012/0307294 A1* | 12/2012 | Matsuda | 358/1.15 |
| 2012/0307309 A1 | 12/2012 | Ikegaya | |
| 2013/0010326 A1 | 1/2013 | Mochizuki | |
| 2013/0024570 A1 | 1/2013 | Mizoguchi | |

(Continued)

OTHER PUBLICATIONS

Berg Cloud; 13 Webpages Downloaded Mar. 5, 2013; bergcloud.com.

(Continued)

*Primary Examiner* — Saeid Ebrahimi Dehkordy
(74) *Attorney, Agent, or Firm* — Michael J. Nickerson; Basch & Nickerson LLP

(57) ABSTRACT

A virtual printer interface node enables a non-cloud-ready printer to communicate with a cloud-based service, residing on an internet. The virtual printer interface node includes a housing; a communication interface to provide communication directly to the network router; and a microcontroller operatively connected to the communication interface. The microcontroller converts commands, received through the communication interface, from the cloud-based service, residing on the internet, to native protocols of the non-cloud-ready networked printer and communicates the converted native protocols to the non-cloud-ready networked printer.

16 Claims, 8 Drawing Sheets

(56) References Cited

U.S. PATENT DOCUMENTS

| | | |
|---|---|---|
| 2013/0097229 A1 | 4/2013 | Webb et al. |
| 2013/0125114 A1 | 5/2013 | Frascadore |
| 2013/0222827 A1 | 8/2013 | Watanabe |
| 2013/0222837 A1 | 8/2013 | Watanabe |

OTHER PUBLICATIONS

Epson to Expand Mobile and Cloud Printing Services; 2 Webpages; Tokyo Japan, Aug. 31, 2011.
Google Cloud Print; Google Developers; 3 Webpages Last Updated Feb. 17, 2012; developers.google.com/cloud-print/docs/overview.
Notice of Allowance Issued May 22, 2014 for Co-Pending U.S. Appl. No. 13/793,338.
Office Action Issued Mar. 25, 2014 for Co-Pending U.S. Appl. No. 13/793,285.
Office Action Issued Mar. 25, 2014 for Co-Pending U.S. Appl. No. 13/793,304.
Office Action Issued Apr. 3, 2014 for Co-Pending U.S. Appl. No. 13/793,350.
Office Action Issued Apr. 3, 2014 for Co-Pending U.S. Appl. No. 13/793,359.
Office Action Issued May 5, 2014 for Co-Pending U.S. Appl. No. 13/793,273.
Office Action Issued May 19, 2014 for Co-Pending U.S. Appl. No. 13/793,261.
Co-Pending U.S. Appl. No. 13/793,311.
Co-Pending U.S. Appl. No. 13/793,376.
For Co-Pending U.S. Appl. No. 13/793,273.
Co-Pending U.S. Appl. No. 13/793,261.
Co-Pending U.S. Appl. No. 13/793,338.
Co-Pending U.S. Appl. No. 13/793,285.
Co-Pending U.S. Appl. No. 13/793,304.
Co-Pending U.S. Appl. No. 13/793,350.
Co-Pending U.S. Appl. No. 13/793,359.
PCT/ISA/206 From Corresponding PCT Application No. PCT/US2013/022968.
Unofficial International Search Report and Written Opinion Dated September 5, 2014 From Corresponding PCT Application PCT/US2014/022968.

* cited by examiner

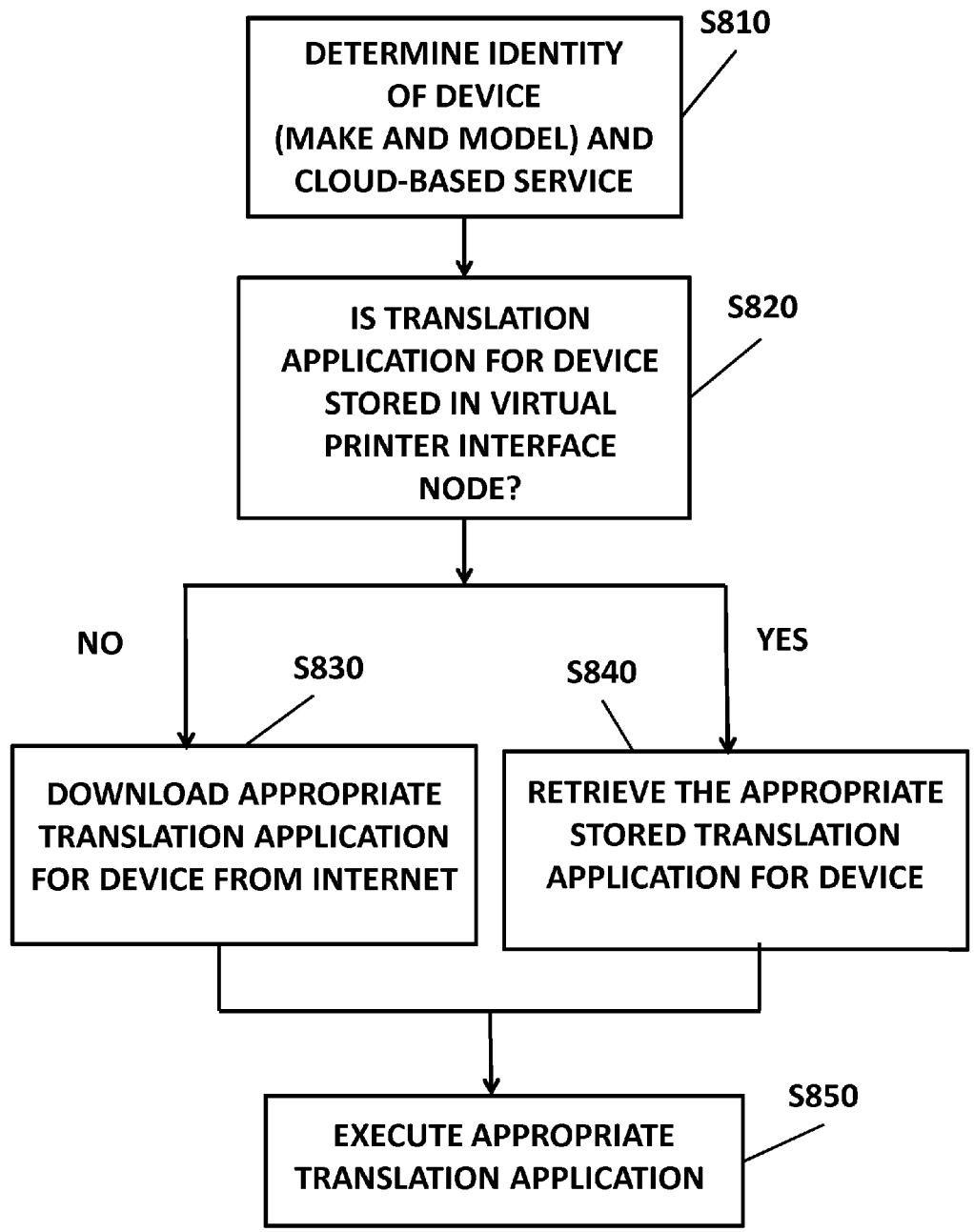

VIRTUAL PRINTER INTERFACE NODE

BACKGROUND

Cloud computing is the use of computing resources (hardware and software) that are delivered as a service over a network (typically the Internet). Traditionally, cloud computing has been focused on web/cloud-based applications and web-connected mobile devices. However, as these web/cloud-based applications and mobile devices have become more capable, users expect the same capabilities from these web/cloud-based applications and mobile devices that the users receive from the users' personal computers. One such capability is printing.

Printing architectures and protocols (print drivers) of conventional personal computer operating systems can be complex and many times are proprietary to the manufacturers of the printing device.

In contrast, a cloud based system is based upon achieving coherence and economies of scale, thereby relying upon converged infrastructure and shared services. Thus, the complexity and proprietary nature of the conventional printing architectures and protocols negatively impact the feasibility of implementing a cloud-based printing service.

One solution has been the development of cloud-ready printers. These printers have built-in systems (native support) for connecting to cloud print services. A cloud-ready printer has no need for a personal computer connection of any kind or for a print driver. The printer can be simply connected directly to a network and then registered with a cloud print service to enable such a printer render print jobs.

However, this solution is not readily backward compatible with the vast number of existing conventional network printers that rely upon the conventional printing architectures and protocols. A network-ready printer is a printer that includes a network interface (wired or wireless) that allows the printer to be directly connected to a network.

One conventional approach, as illustrated in FIG. 1, to enable a conventional network printer to be "cloud-ready" includes running software "connector" on a personal computer 20 associated with the conventional network printer 10, wherein the software "connector" registers the network printer, through a network 30, with the cloud-based service residing on the internet 40.

When a print job is submitted from the cloud-based service residing on the internet 40 to the registered printer 10, the print job is actually routed by the network 30 to the associated personal computer 20.

The communication channel 60 between the network 30 and the associated personal computer 20 may be wired or wireless.

The software "connector," running on the personal computer 20, submits the print job to the printer 10, through the network 30, using the personal computer operating system's native printer software.

The communication channel 50 between the network 30 and the printer 10 may be wired or wireless.

The software "connector," running on the personal computer 20, also communicates, through the network 30, with the cloud-based print service, residing on the internet 40, regarding any status information associated with the printer.

Although this approach provides the printer 10 with a "connection" to a cloud-based service residing on the internet 40, the solution requires that the personal computer 20 remain powered ON, be executing the software "connector," and be connected to the network 30.

In other words, the conventional approach for enabling a non-cloud-ready network printer to be a cloud-ready printer is not a standalone solution but requires a personal computer in combination with the conventional non-cloud-ready network printer.

Thus, it is desirable to provide a device for a non-cloud-ready printer, which enables the printer to be cloud-ready.

Moreover, it is desirable to provide a device for a non-cloud-ready printer, which enables the printer to be cloud-ready and does not require a personal computer to be running.

Furthermore, it is desirable to provide a plug-n-play inline device for a non-cloud-ready printer, which enables the printer to be a cloud-ready printer.

In addition, it is desirable to provide a plug-n-play network device, which enables a non-cloud-ready printer to be a cloud-ready printer and does not require a personal computer to be running.

BRIEF DESCRIPTION OF THE DRAWINGS

The drawings are only for purposes of illustrating various embodiments and are not to be construed as limiting, wherein:

FIG. 8 illustrates a flowchart showing the identification of the proper translation application to be utilized by the virtual printer interface node.

DETAILED DESCRIPTION

Figure 1:
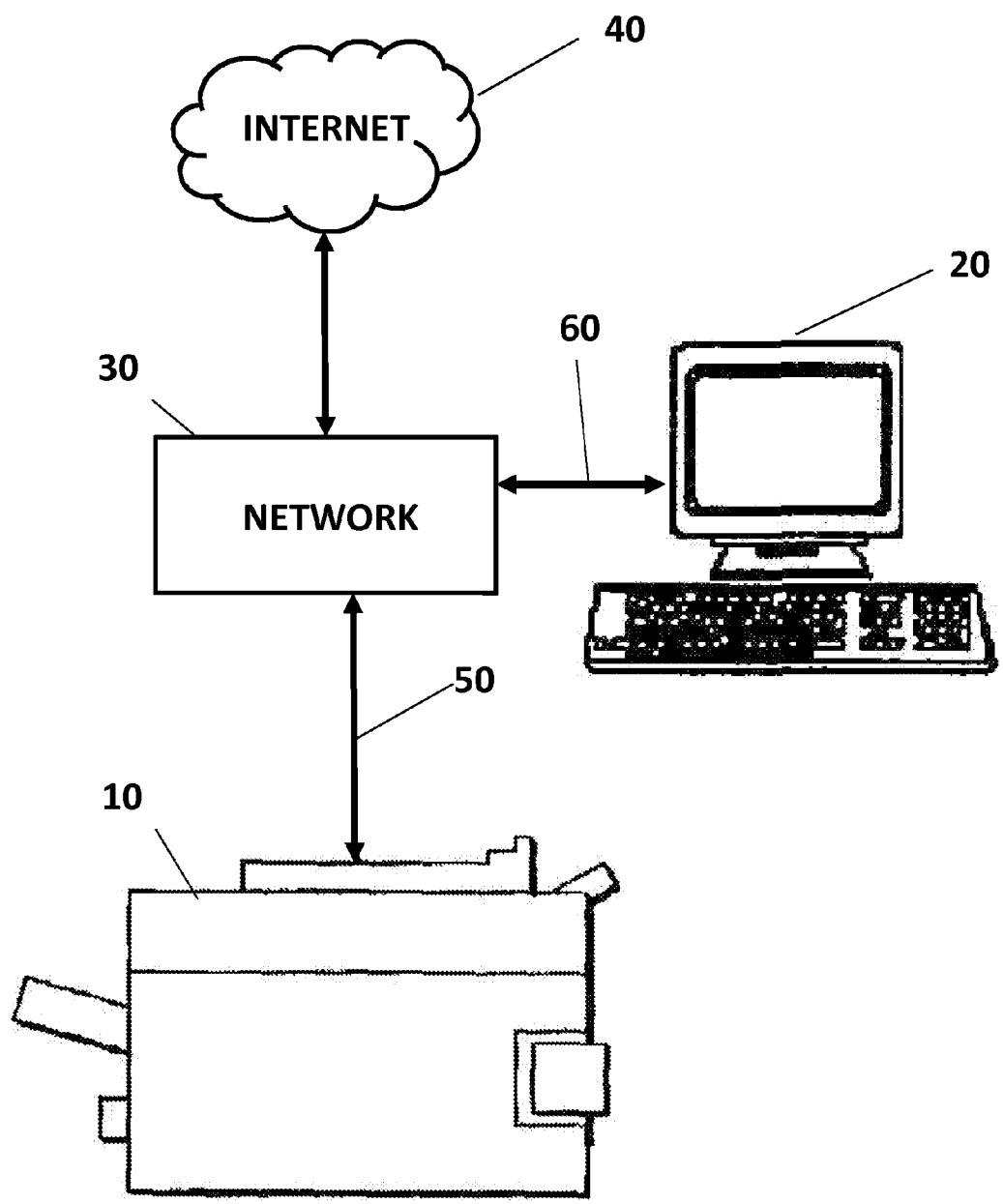
FIG. 1 illustrates a block diagram of a conventional system to enable a conventional network printer to be "cloud-ready;"

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

A cloud environment uses of computing resources (hardware and software) that are delivered as a service over a network (typically the Internet). For example, in a cloud environment, a user can "rent" application software and/or databases, wherein the "cloud" providers manage the infrastructure and platforms on which the applications run, and the databases are stored.

In another example, end users may access cloud-based applications through a web browser or a light-weight desktop or mobile app while the software and user's data are stored on servers at a remote location.

As mentioned above, a user may desire to have a conventional non-cloud-ready printer be fully functional with cloud based services. To have a conventional non-cloud-ready printer be fully functional with cloud based services, the issues with the native protocols and architecture of the conventional non-cloud-ready printer not being readily compatible with the protocols of the cloud based service.

Figure 2:
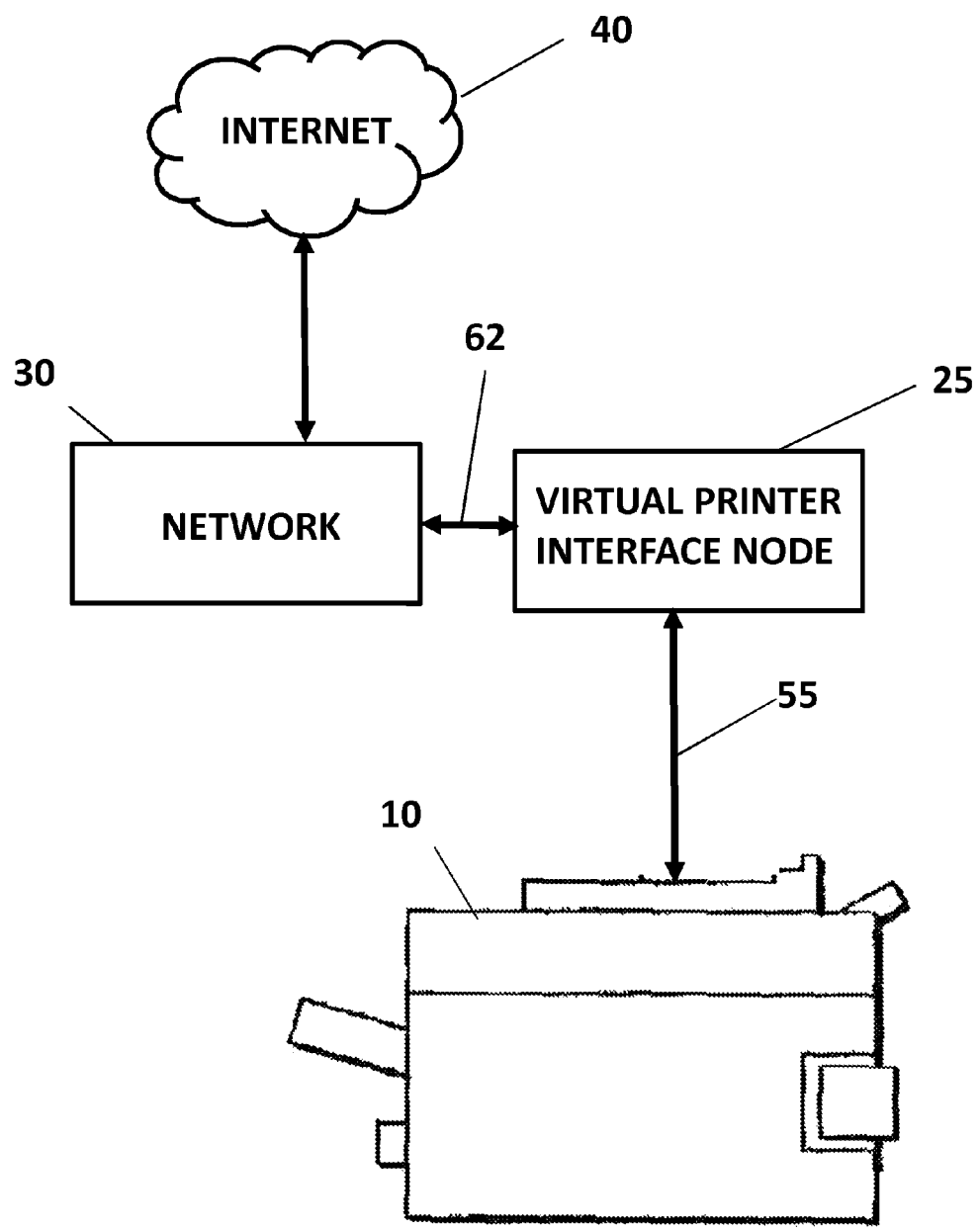
FIG. 2 illustrates a block diagram of system using an inline device to enable a conventional network printer to be "cloud-ready;"

As illustrated in FIG. 2, an inline virtual printer interface node 25 is provided to enable communication between a conventional non-cloud-ready printer 10 and a cloud-based print service, residing on the internet 40. The inline virtual printer interface node 25 is connected between the network (router) 30 and the conventional non-cloud-ready printer 10.

The communication channel 62 (connection) between the inline virtual printer interface node 25 and the network (router) 30 may be wired or wireless.

It is further noted that the inline virtual printer interface node 25, if the communication channel 62 (connection) between the inline virtual printer interface node 25 and the network (router) 30 is "wired," may include a cable jack port (RJ45) for receiving a cable coming from the network (router) 30.

On the other hand, it is noted that the inline virtual printer interface node 25, if the communication channel 62 (connection) between the inline virtual printer interface node 25 and the network (router) 30 is "wired," may include a cable jack for plugging in directly to a port of the network (router) 30.

Moreover, the communication channel 55 (connection) between the inline virtual printer interface node 25 and the conventional non-cloud-ready printer 10 may be wired or wireless.

It is further noted that the inline virtual printer interface node 25, if the communication channel 55 (connection) between the inline virtual printer interface node 25 and the conventional non-cloud-ready printer 10 is "wired," may include a cable jack port (RJ45) for receiving a cable coming from the conventional non-cloud-ready printer 10.

On the other hand, it is noted that the inline virtual printer interface node 25, if the communication channel 55 (connection) between the inline virtual printer interface node 25 and the conventional non-cloud-ready printer 10 is "wired," may include a cable jack for plugging in directly to a port (network interface) of the conventional non-cloud-ready printer 10.

The inline virtual printer interface node 25 converts the native protocols of the conventional non-cloud-ready printer 10 to a unified protocol that can be used by a cloud based service, residing on the internet 40. In addition, the inline virtual printer interface node 25 converts the protocols used by the cloud based service, residing on the internet 40, to the native protocols of the conventional non-cloud-ready printer 10.

Since the inline virtual printer interface node 25 is a physical device that is inline between the conventional non-cloud-ready printer 10 and the network (router) 30, the system does not require a personal computer to be running to enable the conventional non-cloud-ready printer 10 to be "cloud-ready."

Figure 3:
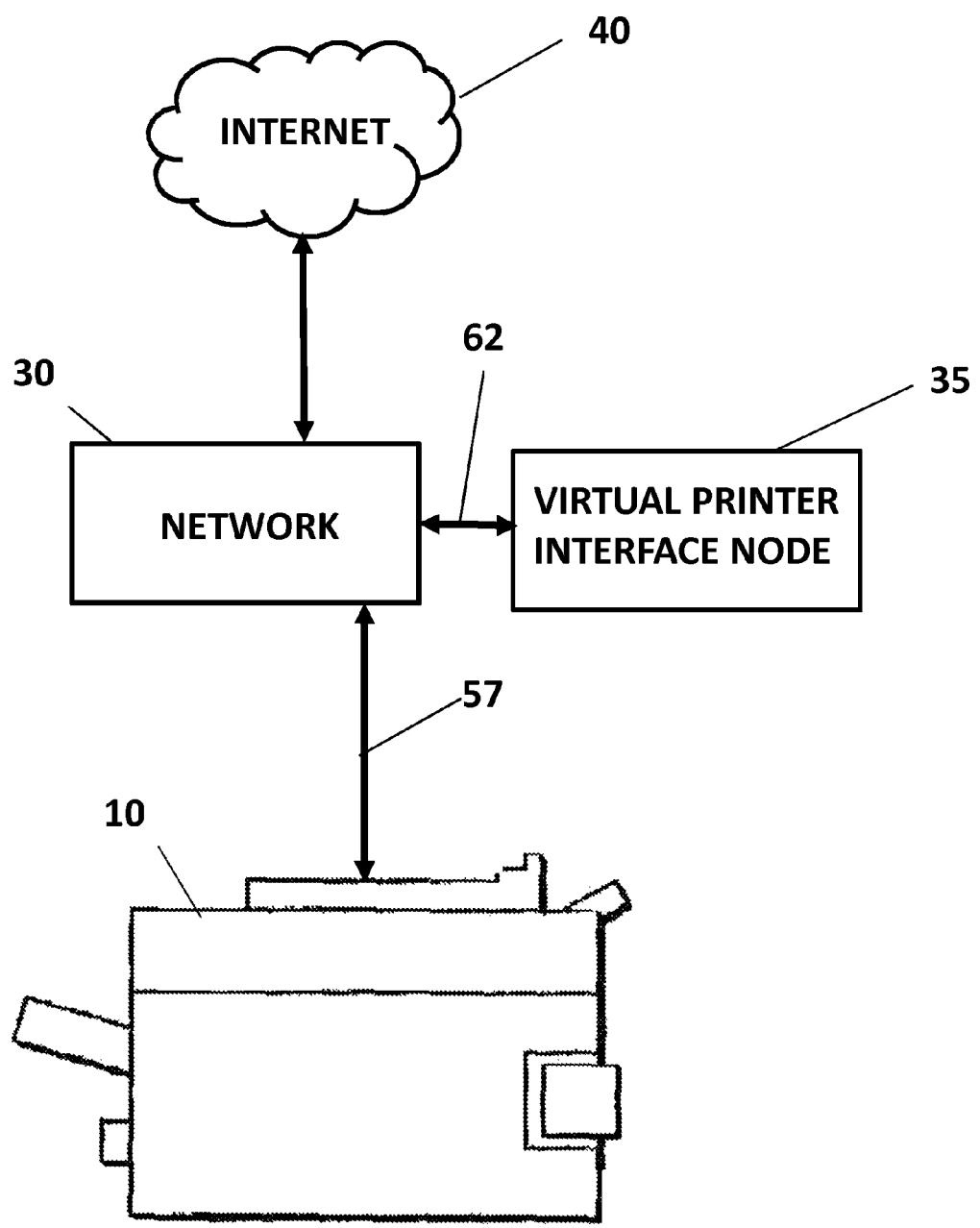
FIG. 3 illustrates a block diagram of system using a network device to enable a conventional network printer to be "cloud-ready;"

In another embodiment, as illustrated in FIG. 3, a network virtual printer interface node 35 is provided to enable communication between a conventional non-cloud-ready printer 10 and a cloud-based print service, residing on the internet 40. The network virtual printer interface node 35 is connected to the network (router) 30 and communicates with the conventional non-cloud-ready printer 10 through the network (router) 30.

The communication channel 62 (connection) between the network virtual printer interface node 35 and the network (router) 30 may be wired or wireless.

It is further noted that the network virtual printer interface node 35, if the communication channel 62 (connection) between the network virtual printer interface node 35 and the network (router) 30 is "wired," may include a cable jack port (RJ45) for receiving a cable coming from the network (router) 30.

On the other hand, it is noted that the network virtual printer interface node 35, if the communication channel 62 (connection) between the network virtual printer interface node 35 and the network (router) 30 is "wired," may include a cable jack for plugging in directly to a port of the network (router) 30.

Moreover, the communication channel 57 (connection) between the network (router) 30 and the conventional non-cloud-ready printer 10 may be wired or wireless.

The network virtual printer interface node 35 converts the native protocols of the conventional non-cloud-ready printer 10 to a unified protocol that can be used by a cloud based service, residing on the internet 40. In addition, the network virtual printer interface node 35 converts the protocols used by the cloud based service, residing on the internet 40, to the native protocols of the conventional non-cloud-ready printer 10.

In this embodiment, the network virtual printer interface node 35 receives commands from the cloud based service, residing on the internet 40, through the network (router) 30, and converts these commands to the native protocols of the conventional non-cloud-ready printer 10. The network virtual printer interface node 35 then communicates the converted native protocols to the conventional non-cloud-ready printer 10, through the network (router) 30.

In addition, the network virtual printer interface node 35 may receive information from the conventional non-cloud-ready printer 10, through the network (router) 30, and convert this information into a form that can be readily processed by the cloud based service, residing on the internet 40. The network virtual printer interface node 35 then communicates the converted information to the cloud based service, residing on the internet 40, through the network (router) 30.

Since the network virtual printer interface node 35 is a physical device that is in communication with the conventional non-cloud-ready printer 10 and the network (router) 30, the system does not require a personal computer to be running to enable the conventional non-cloud-ready printer 10 to be "cloud-ready."

Figure 4:
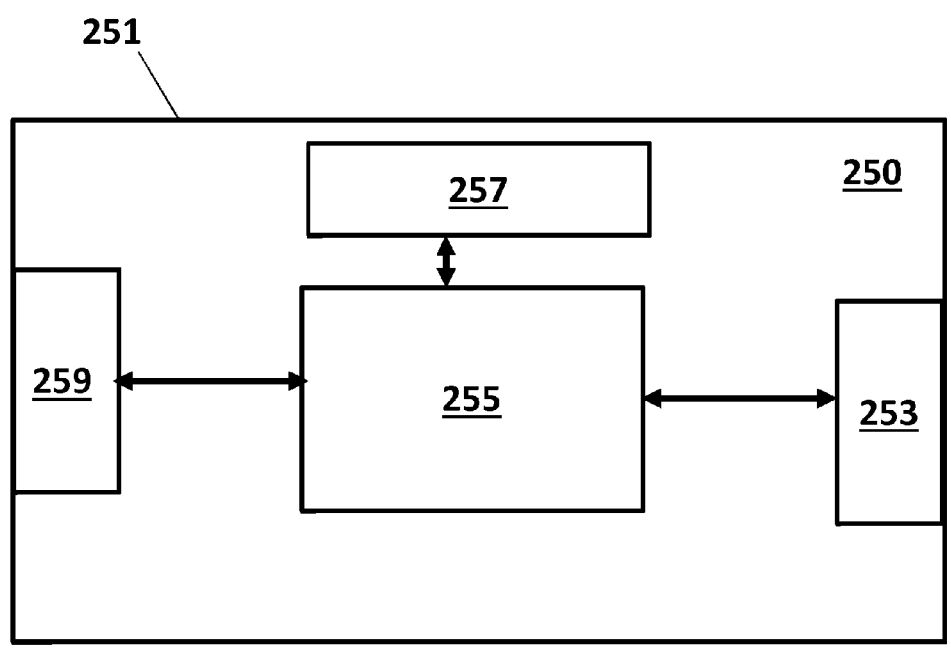
FIG. 4 illustrates a block diagram of an inline virtual printer interface node.

FIG. 4 illustrates a block diagram of an inline virtual printer interface node 250. The inline virtual printer interface node 250 includes a housing 251, two communication interfaces, 253 and 259, a microcontroller or processor 255, and a memory 257.

The communication interfaces, 253 and 259, enable a communication channel to be established between the inline virtual printer interface node 250 and a conventional non-cloud-ready printer or a network (router).

For example, communication interface 253 may enable a communication channel to be established between the inline virtual printer interface node 250 and a conventional non-cloud-ready printer, and communication interface 253 may enable a communication channel to be established between the inline virtual printer interface node 250 and a network (router).

If the communication channel enabled by the communication interface 253 is wireless, the communication interface 253 would include a transmitter and receiver capable of providing wireless communication.

If the communication channel enabled by the communication interface 259 is wireless, the communication interface 259 would include a transmitter and receiver capable of providing wireless communication.

If the communication channel enabled by the communication interface 253 is wired, the communication interface 253 may include a cable jack port (RJ45) for receiving a cable.

For example, if the communication channel enabled by the communication interface 253 is a wired communication channel between the conventional non-cloud-ready printer and the inline virtual printer interface node 250, the communication interface 253 would include a cable jack port (RJ45) for receiving a cable coming from the conventional non-cloud-ready printer.

If the communication channel enabled by the communication interface 259 is wired, the communication interface 259 may include a cable jack port (RJ45) for receiving a cable.

For example, if the communication channel enabled by the communication interface 259 is a wired communication channel between the conventional non-cloud-ready printer and the inline virtual printer interface node 250, the communication interface 259 would include a cable jack port (RJ45) for receiving a cable coming from the conventional non-cloud-ready printer.

If the communication channel enabled by the communication interface 253 is wired, the communication interface 253 may include a cable jack for plugging in directly to a port of a network interface.

For example, if the communication channel enabled by the communication interface 253 is a wired communication channel between the conventional non-cloud-ready printer and the inline virtual printer interface node 250, the communication interface 253 would include an integral cable jack that would plug directly into the cable jack port (RJ45) on the conventional non-cloud-ready printer.

If the communication channel enabled by the communication interface 259 is wired, the communication interface 259 may include a cable jack for plugging in directly to a port of a network interface.

For example, if the communication channel enabled by the communication interface 259 is a wired communication channel between the conventional non-cloud-ready printer and the inline virtual printer interface node 250, the communication interface 259 would include an integral cable jack that would plug directly into the cable jack port (RJ45) on the conventional non-cloud-ready printer.

The microcontroller or processor 255, in conjunction with memory 257, converts commands from a cloud based service, residing on the internet, received through one of the communication interfaces (253 or 259), to the native protocols of a conventional non-cloud-ready printer. The microcontroller or processor 255 then causes the converted native protocols to be communicated to the conventional non-cloud-ready printer through the other communication interfaces (253 or 259).

The microcontroller or processor 255, in conjunction with memory 257, also converts information from a conventional non-cloud-ready printer, received through one of the communication interfaces (253 or 259), into a form that can be readily processed by the cloud based service, residing on the internet. The microcontroller or processor 255 then causes the converted information to be communicated to the cloud based service, residing on the internet, through the other communication interfaces (253 or 259).

It is noted that the microcontroller or processor 255 and memory 257 may be realized by an application specific integrated circuit (ASIC).

It is also noted that the memory 257 may have pre-stored the information and commands necessary to convert the commands from a cloud based service, residing on the internet, to the native protocols of a specific conventional non-cloud-ready printer.

Moreover, it is noted that the inline virtual printer interface node 250 may include functionality to identify the make and model of the conventional non-cloud-ready printer connected thereto. Based upon the identity the make and model of the conventional non-cloud-ready printer connected to the inline virtual printer interface node 250, the inline virtual printer interface node 250 could download, from the internet, the information and commands necessary to convert the commands from a cloud based service, residing on the internet, to the native protocols of the identified conventional non-cloud-ready printer.

Figure 5:
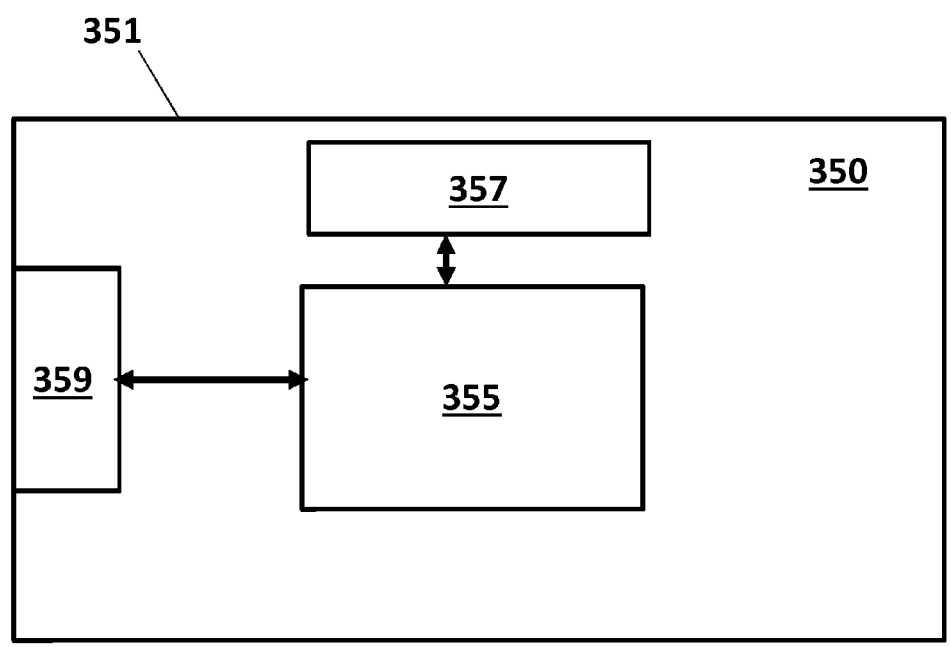
FIG. 5 illustrates a block diagram of a network virtual printer interface node.

FIG. 5 illustrates a block diagram of a network virtual printer interface node 350.

The network virtual printer interface node 350 includes a housing 351, a communication interface 359, a microcontroller or processor 355, and a memory 357.

The communication interface 359 enables a communication channel to be established between the network virtual printer interface node 350 and a conventional non-cloud-ready printer or a network (router).

For example, communication interface 359 may enable a communication channel to be established between the network virtual printer interface node 350 and a conventional non-cloud-ready printer, and communication interface 359 may enable a communication channel to be established between the network virtual printer interface node 350 and a network (router).

If the communication channel enabled by the communication interface 359 is wireless, the communication interface 359 would include a transmitter and receiver capable of providing wireless communication.

If the communication channel enabled by the communication interface 359 is wired, the communication interface 359 may include a cable jack port (RJ45) for receiving a cable.

For example, if the communication channel enabled by the communication interface 359 is a wired communication channel between the conventional non-cloud-ready printer and the network virtual printer interface node 350, the communication interface 359 would include a cable jack port (RJ45) for receiving a cable coming from the conventional non-cloud-ready printer.

If the communication channel enabled by the communication interface 359 is wired, the communication interface 359 may include a cable jack for plugging in directly to a port of a network interface.

For example, if the communication channel enabled by the communication interface 359 is a wired communication channel between the conventional non-cloud-ready printer and the network virtual printer interface node 350, the communication interface 359 would include an integral cable jack that would plug directly into the cable jack port (RJ45) on the conventional non-cloud-ready printer.

The microcontroller or processor 355, in conjunction with memory 357, converts commands from a cloud based service, residing on the internet, received through the communication interface 359, to the native protocols of a conventional non-cloud-ready printer. The microcontroller or processor 255 then causes the converted native protocols to be communicated to the conventional non-cloud-ready printer through the communication interface 359.

The microcontroller or processor 355, in conjunction with memory 357, also converts information from a conventional non-cloud-ready printer, received through the communication interface 359, into a form that can be readily processed by the cloud based service, residing on the internet. The microcontroller or processor 355 then causes the converted information to be communicated to the cloud based service, residing on the internet, through the communication interface 359.

It is noted that the microcontroller or processor 355 and memory 357 may be realized by an application specific integrated circuit (ASIC).

It is also noted that the memory 357 may have pre-stored the information and commands necessary to convert the commands from a cloud based service, residing on the internet, to the native protocols of a specific conventional non-cloud-ready printer.

Moreover, it is noted that the network virtual printer interface node 350 may include functionality to identify the make and model of the conventional non-cloud-ready printer connected thereto. Based upon the identity the make and model of the conventional non-cloud-ready printer connected to the network virtual printer interface node 350, the network virtual printer interface node 350 could download, from the internet, the information and commands necessary to convert the commands from a cloud based service, residing on the internet, to the native protocols of the identified conventional non-cloud-ready printer.

It is noted that since the network virtual printer interface node 350 is not inline with the conventional non-cloud-ready printer, the network virtual printer interface node 350 may be located (connected to) anywhere on the local area network.

It is noted that the virtual printer interface node can receive power over the cables connected to the communication interfaces. If the communication interfaces are wireless, the virtual printer interface node would receive power from a power source.

It is noted that although the virtual printer interface node has been described with respect to a conventional non-cloud-ready printer, the virtual printer interface node can be utilized with a conventional non-cloud-ready multifunction printer; i.e., a device having at least scanning, printing, and copying functionality.

It is further noted that although the virtual printer interface node has been described with respect to a conventional non-cloud-ready printer, the virtual printer interface node can be utilized with a network stand-alone scanner. In this situation, the virtual printer interface node converts the commands from a cloud based service, residing on the internet, to the native protocols of scanner.

The virtual printer interface node enables a conventional non-cloud-ready printer to be availed of cloud-based control based services. These services that are based on acquiring data from the conventional non-cloud-ready printer as well as sending commands to the conventional non-cloud-ready printer.

For example, these services may include break-fix service contracts, supplies contracts, remote monitoring services, and other related print services.

To enable these services, the microcontroller of the virtual printer interface node provides the mechanism to translate between various local area network (LAN) side protocols; such as simple network management protocol (SNMP), hypertext transfer protocol (HTTP), hypertext transfer protocol secure (HTTPs), exchange web service (EWS) screen scraping; and wide area network (WAN) or cloud side protocols; such as customer premise equipment wan management protocol (CWMP) being used as a transport protocol with command set being (a derivative of) the Technical Report 069 (TR 069) specification set.

The microcontroller of the virtual printer interface node may also provide the mechanism to translate between the native application programming interface of the conventional non-cloud-ready printer and the application programming interface of the cloud based service. In this situation, the virtual printer interface node acts a proxy between the conventional non-cloud-ready printer and an application that communicates using a different interface platform by providing either a universal application programming interface on the WAN side or cloud side of the virtual printer interface node or enabling the communication with various interface platforms, wherein the memory would store the necessary information and instructions to recognize the interface being used by the application attempting to access the conventional non-cloud-ready printer and provide the proper translation to the native application programming interface of the conventional non-cloud-ready printer.

The microcontroller of the virtual printer interface node would also provide the translation of the native application programming interface of the conventional non-cloud-ready printer to the application programming interface of the cloud-based application that the conventional non-cloud-ready printer is attempting to access.

For example, a third party provider may offer an application which communicates via the interface platform of the third party interface platform. The virtual printer interface node would act as a proxy to allow the third party application to communicate with a non-enabled third party interface platform device (conventional non-cloud-ready printer) having a different application programming interface.

The microcontroller of the virtual printer interface node may also provide the mechanism to translate between local area network based protocols for the conventional non-cloud-ready printer to firewall friendly wide area network based protocols so as to allow the conventional non-cloud-ready printer to be able to connect to external services (cloud based services).

In the various situations described above, the virtual printer interface node would need the appropriate translation application (translation program and/or translation driver) to enable communication therebetween.

As illustrated in FIG. 8, the virtual printer interface node, at step S810, determines the identity of the device to which it will act as a translator (proxy) and the cloud-based service being utilized.

With respect to the determination the identity of a printing device to which it will act as a translator (proxy), the virtual printer interface node may identify the print driver for the printing device, or the virtual printer interface node may identify the application programming interface utilized by the printing device.

If the device was a scanner, the virtual printer interface node may identify the driver for the scanner, or the virtual printer interface node may identify the application programming interface utilized by the scanner.

With respect to the determination the identity of the cloud-based service being utilized, the virtual printer interface node may identify the application programming interface utilized by the cloud-based service.

This identification process enables the virtual printer interface node to identify the translation couplet.

The virtual printer interface node, at step S820, determines if the appropriate translation application for the identified translation couplet is stored on the virtual printer interface node.

If the appropriate translation application for the identified translation couplet is stored on the virtual printer interface node, at step S840, the appropriate stored translation application is retrieved from a memory in the virtual printer interface node.

If the appropriate translation application for the identified translation couplet is not stored on the virtual printer interface node, at step S830, the appropriate translation application is downloaded from the internet; i.e., downloaded from a website (server) associated with the manufacture of the virtual printer interface node.

The acquired appropriate translation application is executed, as step S850.

The microcontroller of the virtual printer interface node can execute a web server application to provide administration, interaction, reporting, and control from a user's browser which is connected through the local area network or proxied through the cloud connection for remote device interaction. In the later situation, the virtual printer interface node, as noted above, would provide the necessary translations between the native protocols and native application programming interface of the conventional non-cloud-ready printer and the cloud based service.

The virtual printer interface node also enables a conventional non-cloud-ready multifunction printer to be availed of cloud-based content based services. These services are based on moving documents to and from conventional non-cloud-ready multifunction printer to the cloud services such as a cloud service bridge The cloud service bridge is a universal gateway to cloud based third party services. The virtual printer interface node implements a special cloud service bridge client that facilitates the document interchange processes between the conventional non-cloud-ready multifunction printer and the cloud service bridge, which in turn may pass some or all the document to a third party service for additional processing. Such content based services may include: workflow automation, content conversion such as print-ready conversion, optical character recognition, etc.

The content based services could also include consumer services such as brokering and optimization of content that may be available on the broadcast TV or other internet based news channels, feeds, images or other content.

Various examples of content based cloud services are described in co-pending U.S. patent application Ser. No. 13/673,733, filed on Nov. 9, 2012, and entitled "NETWORKED PRINTING SYSTEMS." The entire content of co-pending U.S. patent application Ser. No. 13/673,733 is hereby incorporated by reference.

The virtual printer interface node further enables a conventional non-cloud-ready printer to be availed of device networking services. These services enable conventional non-cloud-ready printer, through the virtual printer interface node, to join a network of other devices that can be exposed to various communities. These communities can be part of a social network, for example, and once exposed to the conventional non-cloud-ready printer, can utilize the services from the conventional non-cloud-ready printer.

For example, the virtual printer interface node can enable the conventional non-cloud-ready printer to be connected to a social network such that when content is uploaded to the community, the content can be readily or automatically printed by the virtual printer interface node.

These communities can also exist for the purpose of enabling an ecommerce model to charge for the service of using the conventional non-cloud-ready printer once the conventional non-cloud-ready printer is exposed to the community.

As noted above, conventional non-cloud-ready printers utilize different versions of an application programming interface making it difficult for a third party system provider to invest adequately in learning a programming system that has a limited applicability, thereby limiting the benefits the third party system provider can provided for the conventional non-cloud-ready printer. The virtual printer interface node implements a universal application programming interface protocol converter such that the third party only needs to invest in a single programming language and interface.

As noted above, since the virtual printer interface node enables the conventional non-cloud-ready printer to be availed of cloud based services, the virtual printer interface node can be used to gate services for the conventional non-cloud-ready printer.

For example, if the conventional non-cloud-ready printer is a multifunction printer (having printing, copying, and/or scanning functionality), the virtual printer interface node could be used to gate services in the MFP based on a subscription model.

In this scenario, the virtual printer interface node acts to block usage of the multifunction printer, through content intercept or passing of settings to the multifunction printer to enable or disable certain features. If a valid active subscription is confirmed, the virtual printer interface node would enable those features.

For security purposes, the virtual printer interface node can utilize authentication protocols to prevent a misuse of remote services.

Figure 6:
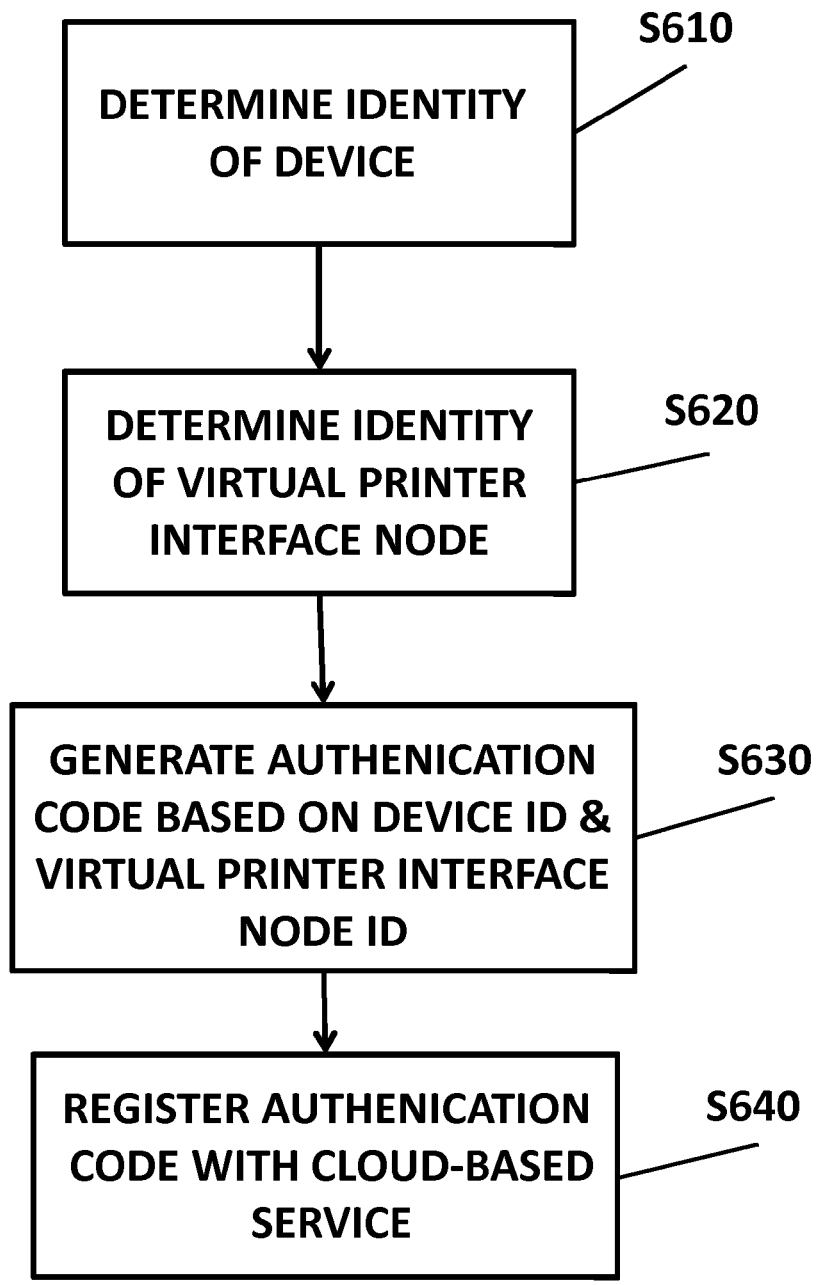
FIG. 6 illustrates a flowchart showing the generation of an authentication code for the virtual printer interface node.

An authentication process is illustrated in FIG. 6. As illustrated in FIG. 6, the virtual printer interface node, at step S610, determines the identity of the device to which it is connected.

If the virtual printer interface node is an inline virtual printer interface node for a printing device, the virtual printer interface node would identify the printing device.

On the other hand, if the virtual printer interface node is a network virtual printer interface node, the virtual printer interface node would identify the router for the local area network.

The virtual printer interface node, at step S620, also determines its identity.

At step S630, the virtual printer interface node creates an authentication code based upon the identity of the device to which it is connected and its identity. This would enable the authentication code to be linked or tied to the device/virtual printer interface node pair.

It is also noted that the authentication code could be generated using a password or other mechanism that uniquely identifies the authorized user of the virtual printer interface node. In this instance, the virtual printer interface node can be utilized with various devices by the authorized user.

At step S640, the generated authentication code is registered with the cloud-based service.

It is noted that the generated authentication code may be registered with a cloud-based service associated with the virtual printer interface node so that if the proper authentication code is not received by the cloud-based service associated with the virtual printer interface node, the virtual printer interface node is blocked from being utilized.

If the virtual printer interface node is blocked from being utilized, this state of operation would not prevent the connected device from being used under normal conditions. In other words, the communications would pass through the virtual printer interface node without processing or translation.

Figure 7:
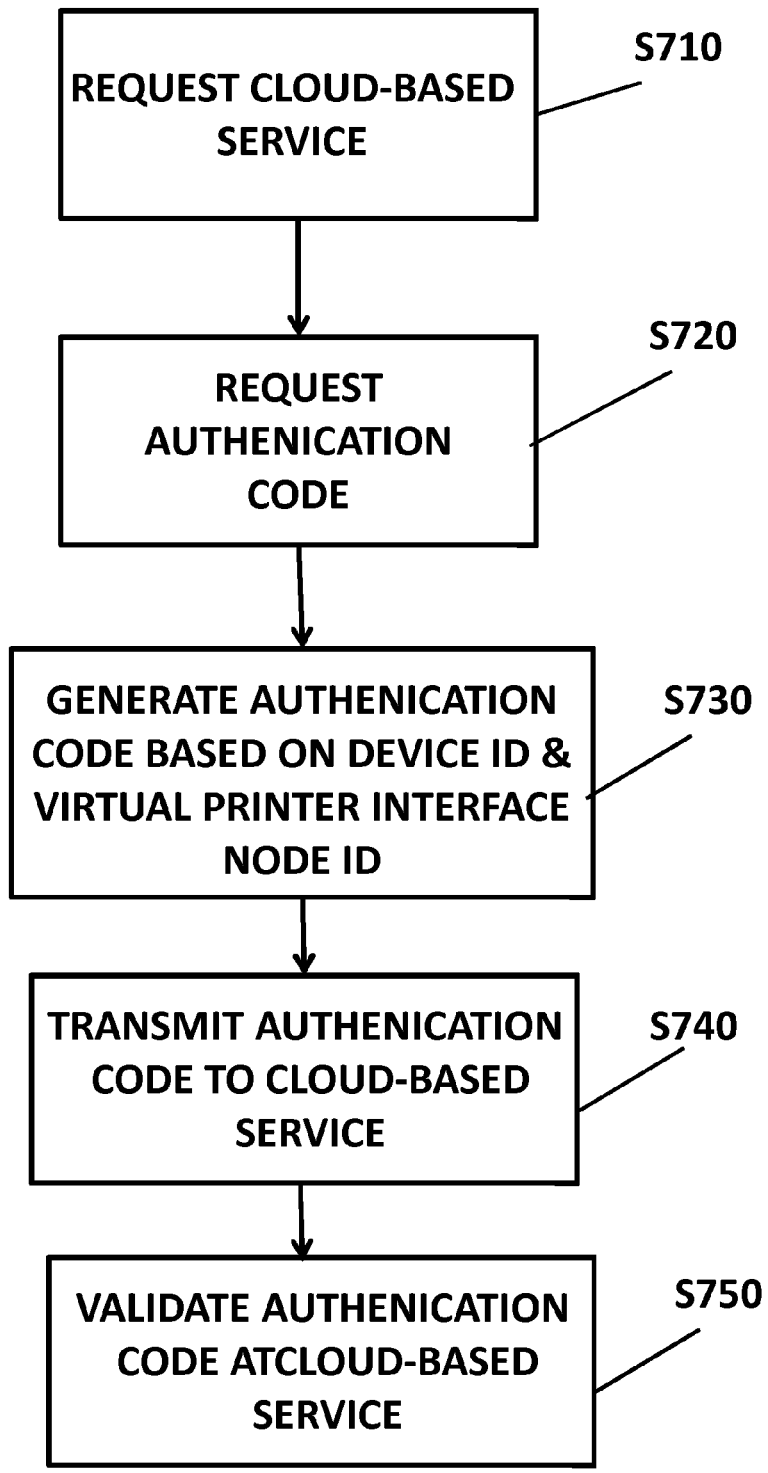
FIG. 7 illustrates a flowchart showing the authentication process between a virtual printer interface node and a cloud-based service.

As illustrated in FIG. 7, when the virtual printer interface node is invoked, at step S710, the cloud-based service associated with the virtual printer interface node requests an authentication code, at step S720. The virtual printer interface node, at step S730, generates an authentication code in a similar manner as described above with respect to FIG. 6.

The authentication code, at step S740, is transmitted to the cloud-based service associated with the virtual printer interface node, and the cloud-based service associated with the virtual printer interface node validates, at step S750, the received authentication code.

If the received authentication code is valid, the cloud-based service associated with the virtual printer interface node may transmit an activation code to the virtual printer interface node to allow the virtual printer interface node to be utilized. The activation code could be time based in that the activation period of the virtual printer interface node may be defined in the activation code; i.e., activation for thirty minutes.

If the received authentication code is not valid, the cloud-based service associated with the virtual printer interface node may transmit a deactivation code to the virtual printer interface node to block the virtual printer interface node from being utilized.

In the alternative, if the received authentication code is not valid, the cloud-based service associated with the virtual printer interface node would not transmit an activation code. In this situation, the virtual printer interface node would be designed not to be activated (functional) without the proper activation code.

For example, the virtual printer interface node may, when the virtual printer interface node is connected to a conventional non-cloud-ready printer, poll the conventional non-cloud-ready printer to obtain unique identification of the conventional non-cloud-ready printer; such as the media access control (MAC) address of the conventional non-cloud-ready printer.

The virtual printer interface node may combine this identification information with the identification information; such the media access control (MAC) address, of the virtual printer interface node to create a unique authentication code.

This unique identification code may be registered with the cloud based service associated with the virtual printer interface node such that whenever a cloud based service is accessed that requires the functionality of the virtual printer interface node, the cloud based service associated with the virtual printer interface node would request the authentication code.

If the virtual printer interface node is connected to a different printer than when the authentication code was registered with the cloud based service associated with the virtual printer interface node and the authentication code is based upon the device/virtual printer interface node pair, the authentication code generated by the virtual printer interface node would be different from the registered code because the code would be a combination of the identification of the new printer and the identification of the virtual printer interface node. In such a situation, the cloud based service would block utilization of the virtual printer interface node.

However, as noted above, the printer could still be utilized in the local area network environment.

More specifically, each time the virtual printer interface node needs to communicate with a cloud based service; the virtual printer interface node would create an authentication code based on current conventional non-cloud-ready printer connected thereto. This tying of the authentication code to the identification of both the virtual printer interface node and the conventional non-cloud-ready printer prevents the virtual printer interface node from being improperly used with another unauthorized printer.

On the other hand, if the authentication code is a user/virtual printer interface node pair, whenever the cloud based service associated with the virtual printer interface node requests the authentication code, the virtual printer interface node would have to acquire the user identification mechanism and generate the authentication code therefrom. The user identification mechanism may be acquired through a user interface on the connected device or other input mechanism.

In summary, the virtual printer interface node intercepts communications between the cloud-based service and the conventional non-cloud-ready printer and provides the appropriate conversion so that the cloud-based service and the conventional non-cloud-ready printer can effectively communicated therebetween.

An inline virtual printer interface node for providing communication between a cloud-based service, residing on an internet, and a non-cloud-ready networked printer through to a network router, includes a housing; a first communication interface to provide communication directly to the network router; a second communication interface to provide communication directly to the non-cloud-ready networked printer; and a microcontroller operatively connected between the first communication interface and the second communication interface. The microcontroller converts commands, received through the first communication interface, from the cloud-based service, residing on the internet, to native protocols of the non-cloud-ready networked printer. The microcontroller communicates, through the second communication interface, the converted native protocols to the non-cloud-ready networked printer.

The first communication interface may be a port to receive a first cable connected to the network router and the second communication interface may be a port to receive a second cable connected to the non-cloud-ready networked printer.

The first communication interface may be a port to receive a first cable connected to the network router and the second communication interface may be a jack for plugging into a network port of the non-cloud-ready networked printer.

The first communication interface may be a transmitter/receiver to create a wireless communication channel with the network router and the second communication interface may be a port to receive a second cable connected to the non-cloud-ready networked printer.

The first communication interface may be a transmitter/receiver to create a wireless communication channel with the network router and the second communication interface may be a jack for plugging into a network port of the non-cloud-ready networked printer.

The first communication interface may be a jack for plugging into a network port of the network router and the second communication interface may be a port to receive a second cable connected to the non-cloud-ready networked printer.

The first communication interface may be a jack for plugging into a network port of the network router and the second communication interface may be a transmitter/receiver to create a wireless communication channel with the non-cloud-ready networked printer.

The first communication interface may be a transmitter/receiver to create a wireless communication channel with the network router.

A system for providing communication between a cloud-based service, residing on an internet, and a non-cloud-ready networked printer, includes a non-cloud-ready networked printer; a network router; and an inline virtual printer interface node. The inline virtual printer interface node includes a housing; a first communication interface to provide communication directly to the network router; a second communication interface to provide communication directly to the non-cloud-ready networked printer; and a microcontroller operatively connected between the first communication interface and the second communication interface. The microcontroller converts commands, received through the first communication interface, from the cloud-based service, residing on the internet, to native protocols of the non-cloud-ready networked printer. The microcontroller communicates, through the second communication interface, the converted native protocols to the non-cloud-ready networked printer.

The first communication interface may be a port to receive a first cable connected to the network router and the second communication interface may be a jack for plugging into a network port of the non-cloud-ready networked printer.

The first communication interface may be a transmitter/receiver to create a wireless communication channel with the network router and the second communication interface may be a port to receive a second cable connected to the non-cloud-ready networked printer.

The first communication interface may be a transmitter/receiver to create a wireless communication channel with the network router and the second communication interface may be a jack for plugging into a network port of the non-cloud-ready networked printer.

The first communication interface may be a jack for plugging into a network port of the network router and the second communication interface may be a port to receive a second cable connected to the non-cloud-ready networked printer.

The first communication interface may be a jack for plugging into a network port of the network router and the second communication interface may be a transmitter/receiver to create a wireless communication channel with the non-cloud-ready networked printer.

The first communication interface may be a transmitter/receiver to create a wireless communication channel with the network router.

The non-cloud-ready networked printer may include scanning, copying, and printing functionality.

A network virtual printer interface node for providing communication between a cloud-based service, residing on an internet, and a non-cloud-ready networked printer through to a network router includes a housing; a communication interface to provide communication directly to the network router; and a microcontroller operatively connected to the communication interface.

The microcontroller converts commands, received through the communication interface, from the cloud-based service, residing on the internet, to native protocols of the non-cloud-ready networked printer.

The microcontroller communicates, through the communication interface, the converted native protocols to the non-cloud-ready networked printer.

The communication interface may be a port to receive a first cable connected to the network router.

The communication interface may be a jack for plugging into a network port of the network router.

The communication interface m a transmitter/receiver to create a wireless communication channel with the network router.

A system for providing communication between a cloud-based service, residing on an internet, and a non-cloud-ready networked printer includes a non-cloud-ready networked printer; a network router; and a network virtual printer interface node. The network virtual printer interface node includes a housing; a communication interface to provide communication directly to the network router; and a microcontroller operatively connected to the communication interface. The microcontroller converts commands, received through the communication interface, from the cloud-based service, residing on the internet, to native protocols of the non-cloud-ready networked printer. The microcontroller communicates, through the communication interface, the converted native protocols to the non-cloud-ready networked printer.

The communication interface may be a port to receive a first cable connected to the network router.

The communication interface may be a jack for plugging into a network port of the network router.

The communication interface m a transmitter/receiver to create a wireless communication channel with the network router.

The non-cloud-ready networked printer may include scanning, copying, and printing functionality.

An inline virtual printer interface node for providing communication between a cloud-based service, residing on an internet, and a non-cloud-ready networked printer through to a network router includes a housing; a first communication interface to provide communication directly to the network router; a second communication interface to provide communication directly to the non-cloud-ready networked printer; and a microcontroller operatively connected between said first communication interface and said second communication interface.

The microcontroller converts commands, received through the first communication interface, from the cloud-based service, residing on the internet, to native protocols of the non-cloud-ready networked printer.

The microcontroller communicates, through the second communication interface, the converted native protocols to the non-cloud-ready networked printer.

The first communication interface may be a port to receive a first cable connected to the network router and the second communication interface may be a port to receive a second cable connected to the non-cloud-ready networked printer.

The first communication interface may be a port to receive a first cable connected to the network router and the second communication interface may be a jack for plugging into a network port of the non-cloud-ready networked printer.

The first communication interface may be a transmitter/receiver to create a wireless communication channel with the network router and the second communication interface may be a port to receive a second cable connected to the non-cloud-ready networked printer.

The first communication interface may be a transmitter/receiver to create a wireless communication channel with the network router and the second communication interface may be a jack for plugging into a network port of the non-cloud-ready networked printer.

The first communication interface may be a jack for plugging into a network port of the network router and the second communication interface may be a port to receive a second cable connected to the non-cloud-ready networked printer.

The first communication interface may be a jack for plugging into a network port of the network router and the second communication interface may be a transmitter/receiver to create a wireless communication channel with the non-cloud-ready networked printer.

The first communication interface may be a transmitter/receiver to create a wireless communication channel with the network router.

The microcontroller may execute a web server application to provide administration, interaction, reporting, and control from a browser which is proxied through the cloud-based service for remote device interaction.

The microcontroller may gate services provided by the non-cloud-ready networked printer in response to restrictions communicated from the cloud-based service to the non-cloud-ready networked printer.

A system for providing communication between a cloud-based service, residing on an internet, and a non-cloud-ready networked printer, includes a non-cloud-ready networked printer; a network router; and an inline virtual printer interface node. The inline virtual printer interface node includes a housing, a first communication interface to provide communication directly to the network router, a second communication interface to provide communication directly to the non-cloud-ready networked printer, and a microcontroller operatively connected between the first communication interface and the second communication interface.

The microcontroller converts commands, received through the first communication interface, from the cloud-based service, residing on the internet, to native protocols of the non-cloud-ready networked printer.

The microcontroller communicates, through the second communication interface, the converted native protocols to the non-cloud-ready networked printer.

The first communication interface may be a port to receive a first cable connected to the network router and the second communication interface may be a port to receive a second cable connected to the non-cloud-ready networked printer.

The first communication interface may be a port to receive a first cable connected to the network router and the second communication interface may be a jack for plugging into a network port of the non-cloud-ready networked printer.

The first communication interface may be a transmitter/receiver to create a wireless communication channel with the network router and the second communication interface may be a port to receive a second cable connected to the non-cloud-ready networked printer.

The first communication interface may be a transmitter/receiver to create a wireless communication channel with the network router and the second communication interface may be a jack for plugging into a network port of the non-cloud-ready networked printer.

The first communication interface may be a jack for plugging into a network port of the network router and the second communication interface may be a port to receive a second cable connected to the non-cloud-ready networked printer.

The first communication interface may be a jack for plugging into a network port of the network router and the second communication interface may be a transmitter/receiver to create a wireless communication channel with the non-cloud-ready networked printer.

The first communication interface may be a transmitter/receiver to create a wireless communication channel with the network router.

The microcontroller may execute a web server application to provide administration, interaction, reporting, and control from a browser which is proxied through the cloud-based service for remote device interaction.

The microcontroller may gate services provided by the non-cloud-ready networked printer in response to restrictions communicated from the cloud-based service to the non-cloud-ready networked printer.

A network virtual printer interface node for providing communication between a cloud-based service, residing on an internet, and a non-cloud-ready networked printer through to a network router, includes a housing; a communication interface to provide communication directly to the network router; and a microcontroller operatively connected to the communication interface.

The microcontroller converts commands, received through the communication interface, from the cloud-based service, residing on the internet, to native protocols of the non-cloud-ready networked printer.

The microcontroller communicates, through the communication interface, the converted native protocols to the non-cloud-ready networked printer.

The communication interface may be a port to receive a first cable connected to the network router.

The communication interface may be a jack for plugging into a network port of the network router.

The communication interface may be a transmitter/receiver to create a wireless communication channel with the network router.

The microcontroller may execute a web server application to provide administration, interaction, reporting, and control from a browser which is proxied through the cloud-based service for remote device interaction.

The microcontroller may gate services provided by the non-cloud-ready networked printer in response to restrictions communicated from the cloud-based service to the non-cloud-ready networked printer.

A system for providing communication between a cloud-based service, residing on an internet, and a non-cloud-ready networked printer, includes a non-cloud-ready networked printer; a network router; and a network virtual printer interface node.

The network virtual printer interface node includes a housing; a communication interface to provide communication directly to the network router; and a microcontroller operatively connected to the communication interface.

The microcontroller converts commands, received through the communication interface, from the cloud-based service, residing on the internet, to native protocols of the non-cloud-ready networked printer.

The microcontroller communicates, through the communication interface, the converted native protocols to the non-cloud-ready networked printer.

The communication interface may be a port to receive a first cable connected to the network router.

The communication interface may be a jack for plugging into a network port of the network router.

The communication interface may be a transmitter/receiver to create a wireless communication channel with the network router.

The microcontroller may execute a web server application to provide administration, interaction, reporting, and control from a browser which is proxied through the cloud-based service for remote device interaction.

The microcontroller may gate services provided by the non-cloud-ready networked printer in response to restrictions communicated from the cloud-based service to the non-cloud-ready networked printer.

An inline virtual printer interface node for providing communication between a cloud-based service, residing on an internet, and a non-cloud-ready networked printer through to a network router, includes a housing; a first communication interface to provide communication directly to the network router; a second communication interface to provide communication directly to the non-cloud-ready networked printer; and a microcontroller operatively connected between the first communication interface and the second communication interface.

The microcontroller converts commands associated with a first application programming interface language, received through the first communication interface, from the cloud-based service, residing on the internet, to commands associated with a native application programming interface language of the non-cloud-ready networked printer, the first application programming interface language being different from the native application programming interface language of the non-cloud-ready networked printer.

The microcontroller communicates, through the second communication interface, the converted commands associated with the native application programming interface language of the non-cloud-ready networked printer.

The first communication interface may be a port to receive a first cable connected to the network router and the second communication interface may be a port to receive a second cable connected to the non-cloud-ready networked printer.

The first communication interface may be a port to receive a first cable connected to the network router and the second communication interface may be a jack for plugging into a network port of the non-cloud-ready networked printer.

The first communication interface may be a transmitter/receiver to create a wireless communication channel with the network router and the second communication interface may be a port to receive a second cable connected to the non-cloud-ready networked printer.

The first communication interface may be a transmitter/receiver to create a wireless communication channel with the network router and the second communication interface may be a jack for plugging into a network port of the non-cloud-ready networked printer.

The first communication interface may be a jack for plugging into a network port of the network router and the second communication interface may be a port to receive a second cable connected to the non-cloud-ready networked printer.

The first communication interface may be a jack for plugging into a network port of the network router and the second communication interface may be a transmitter/receiver to create a wireless communication channel with the non-cloud-ready networked printer.

The first communication interface may be a transmitter/receiver to create a wireless communication channel with the network router.

The microcontroller may execute a web server application to provide administration, interaction, reporting, and control from a browser which is proxied through the cloud-based service for remote device interaction The microcontroller may gate services provided by the non-cloud-ready networked printer in response to restrictions communicated from the cloud-based service to the non-cloud-ready networked printer.

A system for providing communication between a cloud-based service, residing on an internet, and a non-cloud-ready networked printer, includes a non-cloud-ready networked printer; a network router; and an inline virtual printer interface node.

The inline virtual printer interface node includes a housing, a first communication interface to provide communication directly to the network router, a second communication interface to provide communication directly to the non-cloud-ready networked printer, and a microcontroller operatively connected between the first communication interface and the second communication interface.

The microcontroller converts commands associated with a first application programming interface language, received through the first communication interface, from the cloud-based service, residing on the internet, to commands associated with a native application programming interface language of the non-cloud-ready networked printer, the first application programming interface language being different from the native application programming interface language of the non-cloud-ready networked printer.

The microcontroller communicates, through the second communication interface, the converted commands associated with the native application programming interface language of the non-cloud-ready networked printer.

The first communication interface may be a port to receive a first cable connected to the network router and the second communication interface may be a port to receive a second cable connected to the non-cloud-ready networked printer.

The first communication interface may be a port to receive a first cable connected to the network router and the second communication interface may be a jack for plugging into a network port of the non-cloud-ready networked printer.

The first communication interface may be a transmitter/receiver to create a wireless communication channel with the network router and the second communication interface may be a port to receive a second cable connected to the non-cloud-ready networked printer.

The first communication interface may be a transmitter/receiver to create a wireless communication channel with the network router and the second communication interface may be a jack for plugging into a network port of the non-cloud-ready networked printer.

The first communication interface may be a jack for plugging into a network port of the network router and the second communication interface may be a port to receive a second cable connected to the non-cloud-ready networked printer.

The first communication interface may be a jack for plugging into a network port of the network router and the second communication interface may be a transmitter/receiver to create a wireless communication channel with the non-cloud-ready networked printer.

The first communication interface may be a transmitter/receiver to create a wireless communication channel with the network router.

The microcontroller may execute a web server application to provide administration, interaction, reporting, and control from a browser which is proxied through the cloud-based service for remote device interaction The microcontroller may gate services provided by the non-cloud-ready networked printer in response to restrictions communicated from the cloud-based service to the non-cloud-ready networked printer.

A network virtual printer interface node for providing communication between a cloud-based service, residing on an internet, and a non-cloud-ready networked printer through to a network router, includes a housing; a communication interface to provide communication directly to the network router; and a microcontroller operatively connected to the communication interface.

The microcontroller converts commands associated with a first application programming interface language, received through the communication interface, from the cloud-based service, residing on the internet, to commands associated with a native application programming interface language of the non-cloud-ready networked printer, the first application programming interface language being different from the native application programming interface language of the non-cloud-ready networked printer.

The microcontroller communicates, through the communication interface, the converted commands associated with the native application programming interface language of the non-cloud-ready networked printer.

The communication interface may be a port to receive a first cable connected to the network router.

The communication interface may be a jack for plugging into a network port of the network router.

The communication interface may be a transmitter/receiver to create a wireless communication channel with the network router.

The microcontroller may execute a web server application to provide administration, interaction, reporting, and control from a browser which is proxied through the cloud-based service for remote device interaction.

The microcontroller may gate services provided by the non-cloud-ready networked printer in response to restrictions communicated from the cloud-based service to the non-cloud-ready networked printer.

A system for providing communication between a cloud-based service, residing on an internet, and a non-cloud-ready networked printer, includes a non-cloud-ready networked printer; a network router; and a network virtual printer interface node.

The network virtual printer interface node includes a housing; a communication interface to provide communication directly to the network router; and a microcontroller operatively connected to the communication interface.

The microcontroller converts commands associated with a first application programming interface language, received through the communication interface, from the cloud-based service, residing on the internet, to commands associated with a native application programming interface language of the non-cloud-ready networked printer, the first application programming interface language being different from the native application programming interface language of the non-cloud-ready networked printer.

The microcontroller communicates, through the communication interface, the converted commands associated with the native application programming interface language of the non-cloud-ready networked printer.

The communication interface may be a port to receive a first cable connected to the network router.

The communication interface may be a jack for plugging into a network port of the network router.

The communication interface may be a transmitter/receiver to create a wireless communication channel with the network router.

The microcontroller may execute a web server application to provide administration, interaction, reporting, and control from a browser which is proxied through the cloud-based service for remote device interaction.

The microcontroller may gate services provided by the non-cloud-ready networked printer in response to restrictions communicated from the cloud-based service to the non-cloud-ready networked printer.

An inline virtual printer interface node for providing communication between a cloud-based service, residing on an internet, and a non-cloud-ready networked printer through to a network router, includes a housing; a first communication interface to provide communication directly to the network router; a second communication interface to provide communication directly to the non-cloud-ready networked printer; and a microcontroller operatively connected between the first communication interface and the second communication interface.

The microcontroller converts local area network based protocols received from the conventional non-cloud-ready printer to firewall friendly wide area network based protocols, the firewall friendly wide area network based protocols enabling the conventional non-cloud-ready printer to be able to connect to the cloud-based service.

The first communication interface may be a port to receive a first cable connected to the network router and the second communication interface may be a port to receive a second cable connected to the non-cloud-ready networked printer.

The first communication interface may be a port to receive a first cable connected to the network router and the second communication interface may be a jack for plugging into a network port of the non-cloud-ready networked printer.

The first communication interface may be a transmitter/receiver to create a wireless communication channel with the network router and the second communication interface may be a port to receive a second cable connected to the non-cloud-ready networked printer.

The first communication interface may be a transmitter/receiver to create a wireless communication channel with the network router and the second communication interface may be a jack for plugging into a network port of the non-cloud-ready networked printer.

The first communication interface may be a jack for plugging into a network port of the network router and the second communication interface may be a port to receive a second cable connected to the non-cloud-ready networked printer.

The first communication interface may be a jack for plugging into a network port of the network router and the second communication interface may be a transmitter/receiver to create a wireless communication channel with the non-cloud-ready networked printer.

The first communication interface may be a transmitter/receiver to create a wireless communication channel with the network router.

The microcontroller may execute a web server application to provide administration, interaction, reporting, and control from a browser which is proxied through the cloud-based service for remote device interaction The microcontroller may gate services provided by the non-cloud-ready networked printer in response to restrictions communicated from the cloud-based service to the non-cloud-ready networked printer.

A system for providing communication between a cloud-based service, residing on an internet, and a non-cloud-ready networked printer, includes a non-cloud-ready networked printer; a network router; and an inline virtual printer interface node.

The inline virtual printer interface node includes a housing; a first communication interface to provide communication directly to the network router; a second communication interface to provide communication directly to the non-cloud-ready networked printer; and a microcontroller operatively connected between the first communication interface and the second communication interface.

The microcontroller converts local area network based protocols received from the conventional non-cloud-ready printer to firewall friendly wide area network based protocols, the firewall friendly wide area network based protocols enabling the conventional non-cloud-ready printer to be able to connect to the cloud-based service.

The first communication interface may be a port to receive a first cable connected to the network router and the second communication interface may be a port to receive a second cable connected to the non-cloud-ready networked printer.

The first communication interface may be a port to receive a first cable connected to the network router and the second communication interface may be a jack for plugging into a network port of the non-cloud-ready networked printer.

The first communication interface may be a transmitter/receiver to create a wireless communication channel with the network router and the second communication interface may be a port to receive a second cable connected to the non-cloud-ready networked printer.

The first communication interface may be a transmitter/receiver to create a wireless communication channel with the network router and the second communication interface may be a jack for plugging into a network port of the non-cloud-ready networked printer.

The first communication interface may be a jack for plugging into a network port of the network router and the second communication interface may be a port to receive a second cable connected to the non-cloud-ready networked printer.

The first communication interface may be a jack for plugging into a network port of the network router and the second communication interface may be a transmitter/receiver to create a wireless communication channel with the non-cloud-ready networked printer.

The first communication interface may be a transmitter/receiver to create a wireless communication channel with the network router.

The microcontroller may execute a web server application to provide administration, interaction, reporting, and control from a browser which is proxied through the cloud-based service for remote device interaction The microcontroller may gate services provided by the non-cloud-ready networked printer in response to restrictions communicated from the cloud-based service to the non-cloud-ready networked printer.

A network virtual printer interface node for providing communication between a cloud-based service, residing on an internet, and a non-cloud-ready networked printer through to a network router, includes a housing; a communication interface to provide communication directly to the network router; and a microcontroller operatively connected to the communication interface.

The microcontroller converts local area network based protocols received from the conventional non-cloud-ready printer to firewall friendly wide area network based protocols, the firewall friendly wide area network based protocols enabling the conventional non-cloud-ready printer to be able to connect to the cloud-based service.

The communication interface may be a port to receive a first cable connected to the network router.

The communication interface may be a jack for plugging into a network port of the network router.

The communication interface may be a transmitter/receiver to create a wireless communication channel with the network router.

The microcontroller may execute a web server application to provide administration, interaction, reporting, and control from a browser which is proxied through the cloud-based service for remote device interaction.

The microcontroller may gate services provided by the non-cloud-ready networked printer in response to restrictions communicated from the cloud-based service to the non-cloud-ready networked printer.

A system for providing communication between a cloud-based service, residing on an internet, and a non-cloud-ready networked printer, includes anon-cloud-ready networked printer; a network router; and a network virtual printer interface node.

The network virtual printer interface node includes a housing; a communication interface to provide communication directly to the network router; and a microcontroller operatively connected to the communication interface.

The microcontroller converts local area network based protocols received from the conventional non-cloud-ready printer to firewall friendly wide area network based protocols, the firewall friendly wide area network based protocols enabling the conventional non-cloud-ready printer to be able to connect to the cloud-based service.

The communication interface may be a port to receive a first cable connected to the network router.

The communication interface may be a jack for plugging into a network port of the network router.

The communication interface may be a transmitter/receiver to create a wireless communication channel with the network router.

The microcontroller may execute a web server application to provide administration, interaction, reporting, and control from a browser which is proxied through the cloud-based service for remote device interaction.

The microcontroller may gate services provided by the non-cloud-ready networked printer in response to restrictions communicated from the cloud-based service to the non-cloud-ready networked printer.

An inline virtual printer interface node for providing communication between a cloud-based service, residing on an internet, and a non-cloud-ready networked printer through to a network router, includes a housing; a first communication interface to provide communication directly to the network router; a second communication interface to provide communication directly to the non-cloud-ready networked printer; and a microcontroller operatively connected between the first communication interface and the second communication interface.

The microcontroller polls the non-cloud-ready networked printer to retrieve identification information associated with the non-cloud-ready networked printer.

The microcontroller creates an authentication code based on the identification information retrieved from the non-cloud-ready networked printer and identification information associated with the non-cloud-ready networked printer associated with the inline virtual printer interface node.

The microcontroller registers the created authentication code with the cloud-based service.

The first communication interface may be a port to receive a first cable connected to the network router and the second communication interface may be a port to receive a second cable connected to the non-cloud-ready networked printer.

The first communication interface may be a port to receive a first cable connected to the network router and the second communication interface may be a jack for plugging into a network port of the non-cloud-ready networked printer.

The first communication interface may be a transmitter/receiver to create a wireless communication channel with the network router and the second communication interface may be a port to receive a second cable connected to the non-cloud-ready networked printer.

The first communication interface may be a transmitter/receiver to create a wireless communication channel with the network router and the second communication interface may be a jack for plugging into a network port of the non-cloud-ready networked printer.

The first communication interface may be a jack for plugging into a network port of the network router and the second communication interface may be a port to receive a second cable connected to the non-cloud-ready networked printer.

The first communication interface may be a jack for plugging into a network port of the network router and the second communication interface may be a transmitter/receiver to create a wireless communication channel with the non-cloud-ready networked printer.

The first communication interface may be a transmitter/receiver to create a wireless communication channel with the network router.

The microcontroller may execute a web server application to provide administration, interaction, reporting, and control from a browser which is proxied through the cloud-based service for remote device interaction The microcontroller may gate services provided by the non-cloud-ready networked printer in response to restrictions communicated from the cloud-based service to the non-cloud-ready networked printer.

The identification information associated with the non-cloud-ready networked printer may be a media access control address.

The identification information associated with the inline virtual printer interface node may be a media access control address.

The microcontroller may poll, in response to an authentication request form the cloud based-service, the non-cloud-ready networked printer to retrieve identification information associated with the non-cloud-ready networked printer.

The microcontroller may create an authentication code based on the authentication request triggered identification information retrieved from the non-cloud-ready networked printer and identification information associated with the non-cloud-ready networked printer associated with the inline virtual printer interface node.

A system for providing communication between a cloud-based service, residing on an internet, and a non-cloud-ready networked printer, includes a non-cloud-ready networked printer; a network router; and an inline virtual printer interface node.

The inline virtual printer interface node includes a housing; a first communication interface to provide communication directly to the network router; a second communication interface to provide communication directly to the non-cloud-ready networked printer; and a microcontroller operatively connected between the first communication interface and the second communication interface.

The microcontroller polls the non-cloud-ready networked printer to retrieve identification information associated with the non-cloud-ready networked printer.

The microcontroller creates an authentication code based on the identification information retrieved from the non-cloud-ready networked printer and identification information associated with the non-cloud-ready networked printer associated with the inline virtual printer interface node.

The microcontroller registers the created authentication code with the cloud-based service.

The first communication interface may be a port to receive a first cable connected to the network router and the second communication interface may be a port to receive a second cable connected to the non-cloud-ready networked printer.

The first communication interface may be a port to receive a first cable connected to the network router and the second communication interface may be a jack for plugging into a network port of the non-cloud-ready networked printer.

The first communication interface may be a transmitter/receiver to create a wireless communication channel with the network router and the second communication interface may be a port to receive a second cable connected to the non-cloud-ready networked printer.

The first communication interface may be a transmitter/receiver to create a wireless communication channel with the network router and the second communication interface may be a jack for plugging into a network port of the non-cloud-ready networked printer.

The first communication interface may be a jack for plugging into a network port of the network router and the second communication interface may be a port to receive a second cable connected to the non-cloud-ready networked printer.

The first communication interface may be a jack for plugging into a network port of the network router and the second communication interface may be a transmitter/receiver to create a wireless communication channel with the non-cloud-ready networked printer.

The first communication interface may be a transmitter/receiver to create a wireless communication channel with the network router.

The microcontroller may execute a web server application to provide administration, interaction, reporting, and control from a browser which is proxied through the cloud-based service for remote device interaction The microcontroller may gate services provided by the non-cloud-ready networked printer in response to restrictions communicated from the cloud-based service to the non-cloud-ready networked printer.

The identification information associated with the non-cloud-ready networked printer may be a media access control address.

The identification information associated with the inline virtual printer interface node may be a media access control address.

The microcontroller may poll, in response to an authentication request form the cloud based-service, the non-cloud-ready networked printer to retrieve identification information associated with the non-cloud-ready networked printer.

The microcontroller may create an authentication code based on the authentication request triggered identification information retrieved from the non-cloud-ready networked printer and identification information associated with the non-cloud-ready networked printer associated with the inline virtual printer interface node.

A network virtual printer interface node for providing communication between a cloud-based service, residing on an internet, and a non-cloud-ready networked printer through to a network router, includes a housing; a communication interface to provide communication directly to the network router; and a microcontroller operatively connected to the communication interface.

The microcontroller polls the non-cloud-ready networked printer to retrieve identification information associated with the non-cloud-ready networked printer.

The microcontroller creates an authentication code based on the identification information retrieved from the non-cloud-ready networked printer and identification information associated with the non-cloud-ready networked printer associated with the inline virtual printer interface node.

The microcontroller registers the created authentication code with the cloud-based service.

The communication interface may be a port to receive a first cable connected to the network router.

The communication interface may be a jack for plugging into a network port of the network router.

The communication interface may be a transmitter/receiver to create a wireless communication channel with the network router.

The microcontroller may execute a web server application to provide administration, interaction, reporting, and control from a browser which is proxied through the cloud-based service for remote device interaction.

The microcontroller may gate services provided by the non-cloud-ready networked printer in response to restrictions communicated from the cloud-based service to the non-cloud-ready networked printer.

The identification information associated with the non-cloud-ready networked printer may be a media access control address.

The identification information associated with the inline virtual printer interface node may be a media access control address.

The microcontroller may poll, in response to an authentication request form the cloud based-service, the non-cloud-ready networked printer to retrieve identification information associated with the non-cloud-ready networked printer.

The microcontroller may create an authentication code based on the authentication request triggered identification information retrieved from the non-cloud-ready networked printer and identification information associated with the non-cloud-ready networked printer associated with the inline virtual printer interface node.

A system for providing communication between a cloud-based service, residing on an internet, and a non-cloud-ready networked printer, includes a non-cloud-ready networked printer; a network router; and a network virtual printer interface node.

The network virtual printer interface node includes a housing; a communication interface to provide communication directly to the network router; and a microcontroller operatively connected to the communication interface.

The microcontroller polls the non-cloud-ready networked printer to retrieve identification information associated with the non-cloud-ready networked printer.

The microcontroller creates an authentication code based on the identification information retrieved from the non-cloud-ready networked printer and identification information associated with the non-cloud-ready networked printer associated with the inline virtual printer interface node.

The microcontroller registers the created authentication code with the cloud-based service.

The communication interface may be a port to receive a first cable connected to the network router.

The communication interface may be a jack for plugging into a network port of the network router.

The communication interface may be a transmitter/receiver to create a wireless communication channel with the network router.

The microcontroller may execute a web server application to provide administration, interaction, reporting, and control from a browser which is proxied through the cloud-based service for remote device interaction.

The microcontroller may gate services provided by the non-cloud-ready networked printer in response to restrictions communicated from the cloud-based service to the non-cloud-ready networked printer.

The identification information associated with the non-cloud-ready networked printer may be a media access control address.

The identification information associated with the inline virtual printer interface node may be a media access control address.

The microcontroller may poll, in response to an authentication request form the cloud based-service, the non-cloud-ready networked printer to retrieve identification information associated with the non-cloud-ready networked printer.

The microcontroller may create an authentication code based on the authentication request triggered identification information retrieved from the non-cloud-ready networked printer and identification information associated with the non-cloud-ready networked printer associated with the inline virtual printer interface node.

An inline virtual printer interface node for providing communication between a cloud-based service, residing on an internet, and a non-cloud-ready networked printer through to a network router, includes a housing; a first communication interface to provide communication directly to the network router; a second communication interface to provide communication directly to the non-cloud-ready networked printer; and a microcontroller operatively connected between the first communication interface and the second communication interface.

The microcontroller converts commands, received through the first communication interface, from the cloud-based service, residing on the internet, to native protocols of the non-cloud-ready networked printer.

The microcontroller communicates, through the second communication interface, the converted native protocols to the non-cloud-ready networked printer.

The microcontroller converts commands associated with a first application programming interface language, received through the first communication interface, from the cloud-based service, residing on the internet, to commands associated with a native application programming interface language of the non-cloud-ready networked printer, the first application programming interface language being different from the native application programming interface language of the non-cloud-ready networked printer.

The microcontroller communicates, through the second communication interface, the converted commands associated with the native application programming interface language of the non-cloud-ready networked printer. The microcontroller polls the non-cloud-ready networked printer to retrieve identification information associated with the non-cloud-ready networked printer.

The microcontroller creates an authentication code based on the identification information retrieved from the non-cloud-ready networked printer and identification information associated with the non-cloud-ready networked printer associated with the inline virtual printer interface node.

The microcontroller registers the created authentication code with the cloud-based service.

The first communication interface may be a port to receive a first cable connected to the network router and the second communication interface may be a port to receive a second cable connected to the non-cloud-ready networked printer.

The first communication interface may be a port to receive a first cable connected to the network router and the second communication interface may be a jack for plugging into a network port of the non-cloud-ready networked printer.

The first communication interface may be a transmitter/receiver to create a wireless communication channel with the network router and the second communication interface may be a port to receive a second cable connected to the non-cloud-ready networked printer.

The first communication interface may be a transmitter/receiver to create a wireless communication channel with the network router and the second communication interface may be a jack for plugging into a network port of the non-cloud-ready networked printer.

The first communication interface may be a jack for plugging into a network port of the network router and the second communication interface may be a port to receive a second cable connected to the non-cloud-ready networked printer.

The first communication interface may be a jack for plugging into a network port of the network router and the second communication interface may be a transmitter/receiver to create a wireless communication channel with the non-cloud-ready networked printer.

The first communication interface may be a transmitter/receiver to create a wireless communication channel with the network router.

The microcontroller may execute a web server application to provide administration, interaction, reporting, and control from a browser which is proxied through the cloud-based service for remote device interaction The microcontroller may gate services provided by the non-cloud-ready networked printer in response to restrictions communicated from the cloud-based service to the non-cloud-ready networked printer.

The identification information associated with the non-cloud-ready networked printer may be a media access control address.

The identification information associated with the inline virtual printer interface node may be a media access control address.

The microcontroller may poll, in response to an authentication request form the cloud based-service, the non-cloud-ready networked printer to retrieve identification information associated with the non-cloud-ready networked printer.

The microcontroller may create an authentication code based on the authentication request triggered identification information retrieved from the non-cloud-ready networked printer and identification information associated with the non-cloud-ready networked printer associated with the inline virtual printer interface node.

A system for providing communication between a cloud-based service, residing on an internet, and a non-cloud-ready networked printer, includes a non-cloud-ready networked printer; a network router; and an inline virtual printer interface node.

The inline virtual printer interface node includes a housing; a first communication interface to provide communication directly to the network router; a second communication interface to provide communication directly to the non-cloud-ready networked printer; and a microcontroller operatively connected between the first communication interface and the second communication interface.

The microcontroller converts commands, received through the first communication interface, from the cloud-based service, residing on the internet, to native protocols of the non-cloud-ready networked printer.

The microcontroller communicates, through the second communication interface, the converted native protocols to the non-cloud-ready networked printer.

The microcontroller converts commands associated with a first application programming interface language, received through the first communication interface, from the cloud-based service, residing on the internet, to commands associated with a native application programming interface language of the non-cloud-ready networked printer, the first application programming interface language being different from the native application programming interface language of the non-cloud-ready networked printer.

The microcontroller communicates, through the second communication interface, the converted commands associated with the native application programming interface language of the non-cloud-ready networked printer. The microcontroller polls the non-cloud-ready networked printer to retrieve identification information associated with the non-cloud-ready networked printer.

The microcontroller creates an authentication code based on the identification information retrieved from the non-cloud-ready networked printer and identification information associated with the non-cloud-ready networked printer associated with the inline virtual printer interface node.

The microcontroller registers the created authentication code with the cloud-based service.

The first communication interface may be a port to receive a first cable connected to the network router and the second communication interface may be a port to receive a second cable connected to the non-cloud-ready networked printer.

The first communication interface may be a port to receive a first cable connected to the network router and the second communication interface may be a jack for plugging into a network port of the non-cloud-ready networked printer.

The first communication interface may be a transmitter/receiver to create a wireless communication channel with the network router and the second communication interface may be a port to receive a second cable connected to the non-cloud-ready networked printer.

The first communication interface may be a transmitter/receiver to create a wireless communication channel with the network router and the second communication interface may be a jack for plugging into a network port of the non-cloud-ready networked printer.

The first communication interface may be a jack for plugging into a network port of the network router and the second communication interface may be a port to receive a second cable connected to the non-cloud-ready networked printer.

The first communication interface may be a jack for plugging into a network port of the network router and the second communication interface may be a transmitter/receiver to create a wireless communication channel with the non-cloud-ready networked printer.

The first communication interface may be a transmitter/receiver to create a wireless communication channel with the network router.

The microcontroller may execute a web server application to provide administration, interaction, reporting, and control from a browser which is proxied through the cloud-based service for remote device interaction The microcontroller may gate services provided by the non-cloud-ready networked printer in response to restrictions communicated from the cloud-based service to the non-cloud-ready networked printer.

The identification information associated with the non-cloud-ready networked printer may be a media access control address.

The identification information associated with the inline virtual printer interface node may be a media access control address.

The microcontroller may poll, in response to an authentication request form the cloud based-service, the non-cloud-ready networked printer to retrieve identification information associated with the non-cloud-ready networked printer.

The microcontroller may create an authentication code based on the authentication request triggered identification information retrieved from the non-cloud-ready networked printer and identification information associated with the non-cloud-ready networked printer associated with the inline virtual printer interface node.

A network virtual printer interface node for providing communication between a cloud-based service, residing on an internet, and a non-cloud-ready networked printer through to a network router, includes a housing; a communication interface to provide communication directly to the network router; and a microcontroller operatively connected to the communication interface.

The microcontroller converts commands, received through the communication interface, from the cloud-based service, residing on the internet, to native protocols of the non-cloud-ready networked printer.

The microcontroller communicates, through the communication interface, the converted native protocols to the non-cloud-ready networked printer.

The microcontroller polls the non-cloud-ready networked printer to retrieve identification information associated with the non-cloud-ready networked printer.

The microcontroller creates an authentication code based on the identification information retrieved from the non-cloud-ready networked printer and identification information associated with the non-cloud-ready networked printer associated with the inline virtual printer interface node.

The microcontroller registers the created authentication code with the cloud-based service.

The communication interface may be a port to receive a first cable connected to the network router.

The communication interface may be a jack for plugging into a network port of the network router.

The communication interface may be a transmitter/receiver to create a wireless communication channel with the network router.

The microcontroller may execute a web server application to provide administration, interaction, reporting, and control from a browser which is proxied through the cloud-based service for remote device interaction.

The microcontroller may gate services provided by the non-cloud-ready networked printer in response to restrictions communicated from the cloud-based service to the non-cloud-ready networked printer.

The identification information associated with the non-cloud-ready networked printer may be a media access control address.

The identification information associated with the inline virtual printer interface node may be a media access control address.

The microcontroller may poll, in response to an authentication request form the cloud based-service, the non-cloud-ready networked printer to retrieve identification information associated with the non-cloud-ready networked printer.

The microcontroller may create an authentication code based on the authentication request triggered identification information retrieved from the non-cloud-ready networked printer and identification information associated with the non-cloud-ready networked printer associated with the inline virtual printer interface node.

A system for providing communication between a cloud-based service, residing on an internet, and a non-cloud-ready networked printer, includes a non-cloud-ready networked printer; a network router; and a network virtual printer interface node.

The network virtual printer interface node includes a housing; a communication interface to provide communication directly to the network router; and a microcontroller operatively connected to the communication interface.

The microcontroller converts commands, received through the communication interface, from the cloud-based service, residing on the internet, to native protocols of the non-cloud-ready networked printer.

The microcontroller communicates, through the communication interface, the converted native protocols to the non-cloud-ready networked printer.

The microcontroller polls the non-cloud-ready networked printer to retrieve identification information associated with the non-cloud-ready networked printer.

The microcontroller creates an authentication code based on the identification information retrieved from the non-cloud-ready networked printer and identification information associated with the non-cloud-ready networked printer associated with the inline virtual printer interface node.

The microcontroller registers the created authentication code with the cloud-based service.

The communication interface may be a port to receive a first cable connected to the network router.

The communication interface may be a jack for plugging into a network port of the network router.

The communication interface may be a transmitter/receiver to create a wireless communication channel with the network router.

The microcontroller may execute a web server application to provide administration, interaction, reporting, and control from a browser which is proxied through the cloud-based service for remote device interaction.

The microcontroller may gate services provided by the non-cloud-ready networked printer in response to restrictions communicated from the cloud-based service to the non-cloud-ready networked printer.

The identification information associated with the non-cloud-ready networked printer may be a media access control address.

The identification information associated with the inline virtual printer interface node may be a media access control address.

The microcontroller may poll, in response to an authentication request form the cloud based-service, the non-cloud-ready networked printer to retrieve identification information associated with the non-cloud-ready networked printer.

The microcontroller may create an authentication code based on the authentication request triggered identification information retrieved from the non-cloud-ready networked printer and identification information associated with the non-cloud-ready networked printer associated with the inline virtual printer interface node.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A network virtual printer interface node for providing communication between a cloud-based service, residing on an internet, and a non-cloud-ready networked printer, residing on a local area network, through to a network router, the network virtual printer interface node residing as a distinct device on the local area network, the network router controlling communications between the local area network and the internet, the network router having a local area network communication interface and an internet communication interface, comprising:

a housing;

a communication interface to provide communication directly to the local area network communication interface of the network router; and a microcontroller, located within said housing, operatively connected to said communication interface;

said communication interface providing communication between said microcontroller and the local area network communication interface of the network router, the network router providing a communication path between said microcontroller and the non-cloud-ready networked printer;

said microcontroller converting local area network based protocols received, through said communication interface, from the non-cloud-ready networked printer to firewall friendly wide area network based protocols, the firewall friendly wide area network based protocols enabling the non-cloud-ready networked printer to be able to connect to the cloud-based service;

said microcontroller transmitting, through said communication interface via the network router, the firewall friendly wide area network based protocols to the cloud-based service.

2. The network virtual printer interface node as claimed in claim 1, wherein said communication interface is a port to receive a first cable connected to the local area network communication interface of the network router.

3. The network virtual printer interface node as claimed in claim 1, wherein said communication interface is a jack for plugging into the local area network communication interface of the network router.

4. The network virtual printer interface node as claimed in claim 1, wherein said communication interface is a transmitter/receiver to create a wireless communication channel with the local area network communication interface of the network router.

5. The network virtual printer interface node as claimed in claim 1, wherein said microcontroller executes a web server application to provide administration, interaction, reporting, and control from a browser which is proxied through the cloud-based service for remote device interaction.

6. The network virtual printer interface node as claimed in claim 1, wherein said microcontroller gates services provided by the non-cloud-ready networked printer in response to restrictions communicated from the cloud-based service to the non-cloud-ready networked printer.

7. A system for providing communication between a cloud-based service, residing on an internet, and a non-cloud-ready networked printer, comprising:

a non-cloud-ready networked printer residing on a local area network;

a network router for controlling communications between the local area network and the internet;

said network router having a local area network communication interface port and an internet communication interface port; and a network virtual printer interface node residing as a distinct device on the local area network;

said non-cloud-ready networked printer being communicatively connected to a local area network communication interface port of said network router;

said network virtual printer interface node being communicatively connected to a local area network communication interface port of said network router;

said network virtual printer interface node including,
a housing,
a communication interface to provide communication with said local area network communication interface port of said network router, and
a microcontroller, located within said housing, operatively connected to said communication interface;

said communication interface providing communication between said microcontroller and said local area network communication interface port of said network router;

said network router providing a communication path between said microcontroller and said non-cloud-ready networked printer;

said microcontroller converting local area network based protocols received, through said communication interface, from said non-cloud-ready networked printer to firewall friendly wide area network based protocols, the firewall friendly wide area network based protocols enabling said non-cloud-ready networked printer to be able to connect to the cloud-based service;

said microcontroller transmitting, through said communication interface via said network router, the firewall friendly wide area network based protocols to the cloud-based service.

8. The system as claimed in claim 7, wherein said communication interface is a port to receive a first cable connected to said local area network communication interface port of said network router.

9. The system as claimed in claim 7, wherein said first communication interface is a jack for plugging into said local area network communication interface port of said network router.

10. The system as claimed in claim 7, wherein said non-cloud-ready networked printer includes scanning, copying, and printing functionality.

11. The system as claimed in claim 7, wherein said microcontroller executes a web server application to provide administration, interaction, reporting, and control from a browser which is proxied through the cloud-based service for remote device interaction.

12. The system as claimed in claim 7, wherein said microcontroller gates services provided by said non-cloud-ready networked printer in response to restrictions communicated from the cloud-based service to said non-cloud-ready networked printer.

13. A system for providing communication between a cloud-based service, residing on an internet, and a non-cloud-ready networked printer, comprising:

a non-cloud-ready networked printer residing on a local area network;

a network router for controlling communications between the local area network and the internet;

said network router having a local area network wireless communication interface and an internet communication interface port; and a network virtual printer interface node residing as a distinct device on the local area network;

said non-cloud-ready networked printer being wirelessly communicatively connected to a local area network communication interface port of said network router;

said network virtual printer interface node being wirelessly communicatively connected to a local area network communication interface port of said network router;

said network virtual printer interface node including,
a housing,
a wireless communication interface to provide wireless communication, and
a microcontroller, located within said housing, operatively connected to said wireless communication interface;

said wireless communication interface providing wireless communication between said microcontroller and said local area network communication interface of said network router;

said network router providing a communication path between said microcontroller and said non-cloud-ready networked printer;

said microcontroller converting local area network based protocols received, through said communication interface, from said non-cloud-ready networked printer to firewall friendly wide area network based protocols, the firewall friendly wide area network based protocols enabling said non-cloud-ready networked printer to be able to connect to the cloud-based service;

said microcontroller transmitting, through said wireless communication interface via said network router, the firewall friendly wide area network based protocols to the cloud-based service.

14. The system as claimed in claim 13, wherein said non-cloud-ready networked printer includes scanning, copying, and printing functionality.

15. The system as claimed in claim 13, wherein said microcontroller executes a web server application to provide administration, interaction, reporting, and control from a browser which is proxied through the cloud-based service for remote device interaction.

16. The system as claimed in claim 13, wherein said microcontroller gates services provided by said non-cloud-ready networked printer in response to restrictions communicated from the cloud-based service to said non-cloud-ready networked printer.

* * * * *